United States Patent [19]

Inoue

[11] Patent Number: 5,410,438
[45] Date of Patent: Apr. 25, 1995

[54] APPARATUS FOR SELECTIVELY RECORDING AND REPRODUCING A DIGITAL VIDEO SIGNAL TO PROVIDE A SMOOTH CONTINUATION IN A VIDEO PICTURE PRODUCED THEREFROM

[75] Inventor: Hajime Inoue, Chiba, Japan

[73] Assignee: Sony Corporation, Tokyo, Japan

[21] Appl. No.: 61,732

[22] Filed: May 17, 1993

[30] Foreign Application Priority Data

May 20, 1992 [JP] Japan .................. 4-154400

[51] Int. Cl.⁶ .............. G11B 27/02; G11B 15/12; G11B 5/78
[52] U.S. Cl. ................... 360/62; 360/14.1; 360/33.1
[58] Field of Search .............. 360/10.1, 32, 48, 33.1, 360/36.1, 51, 53, 46, 70, 74.1, 14.1; 358/335, 311

[56] References Cited

U.S. PATENT DOCUMENTS

| | | | |
|---|---|---|---|
| 4,825,307 | 4/1989 | Otokawa et al. | 360/27 |
| 4,862,292 | 8/1989 | Enari et al. | 360/32 X |
| 4,887,169 | 12/1989 | Bannai et al. | 358/335 |
| 5,050,009 | 9/1991 | Takahashi et al. | 360/33.1 |
| 5,057,949 | 10/1991 | Suga et al. | 360/70 |
| 5,113,295 | 5/1992 | Sudoh et al. | 360/49 |
| 5,170,298 | 12/1992 | Fukami et al. | 360/32 X |
| 5,210,658 | 5/1993 | Oguri et al. | 360/46 X |
| 5,220,435 | 6/1993 | Yamaguchi et al. | 360/32 X |

FOREIGN PATENT DOCUMENTS

| | | |
|---|---|---|
| 0154485 | 9/1985 | European Pat. Off. . |
| 0341319 | 11/1989 | European Pat. Off. . |
| 0407046 | 1/1991 | European Pat. Off. . |
| 0465110 | 1/1992 | European Pat. Off. . |
| 4117059 | 5/1991 | Germany . |
| 2149192 | 6/1985 | United Kingdom . |

OTHER PUBLICATIONS

Patent Abstracts of Japan vol. 9, No. 144 (P-365) 19 Jun. 1985 & JP-A-60 022 752 (Matsushita Denki Sangyo K.K.) 5 Feb. 1985.

Patent Abstracts of Japan vol. 9, No. 106 (E-313) 10 May 1985 & JP-A-59 229 978 (Mitsubishi Denki K.K.) 24 Dec. 1984.

Patent Abstracts of Japan vol. 16, No. 105 (P-1325) 16 Mar. 1992 & JP-A-03 280 236 (Aiwa Co Ltd) 11 Dec. 1991.

Patent Abstracts of Japan vol. 8, No. 175 (P-294) 11 Aug. 1984 & JP-A-59 068 881 (Sony KK) 18 Apr. 1984.

Primary Examiner—John Shepperd
Assistant Examiner—Thien Minh Le
Attorney, Agent, or Firm—William S. Frommer; Alvin Sinderbrand

[57] ABSTRACT

Digital video tape recorder which provides a smooth continuation in a video picture reproduced from a medium on which new digital video signals immediately follow previously recorded digital video signals. A signal processor processes a unit consisting of a field or frame interval of a video signal into a digital video signal. The digital video signal is recorded with identification data on a plurality of recording tracks on a magnetic tape. When a new digital video signal is recorded immediately following an existing digital video signal, the magnetic tape is rewound by a predetermined distance, then the digital video signal and identification data that had been recorded previously are reproduced until an end of a unit is reached, whereupon recording circuitry is activated to record the new digital video signal.

14 Claims, 6 Drawing Sheets

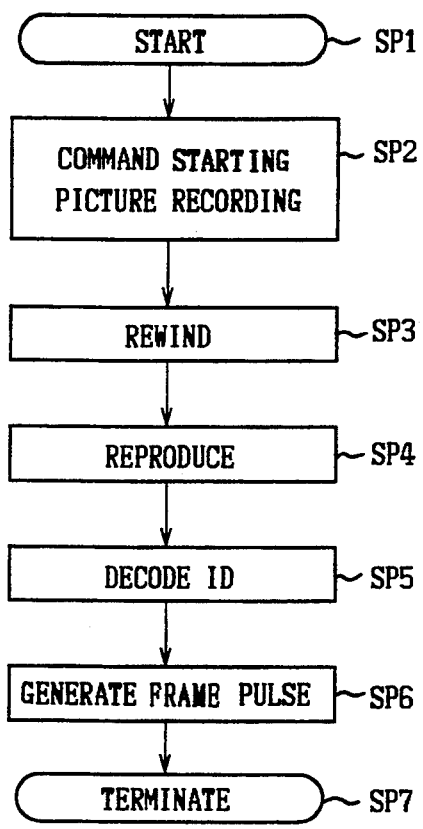
FIG. 8
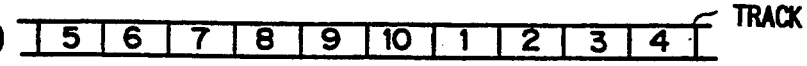

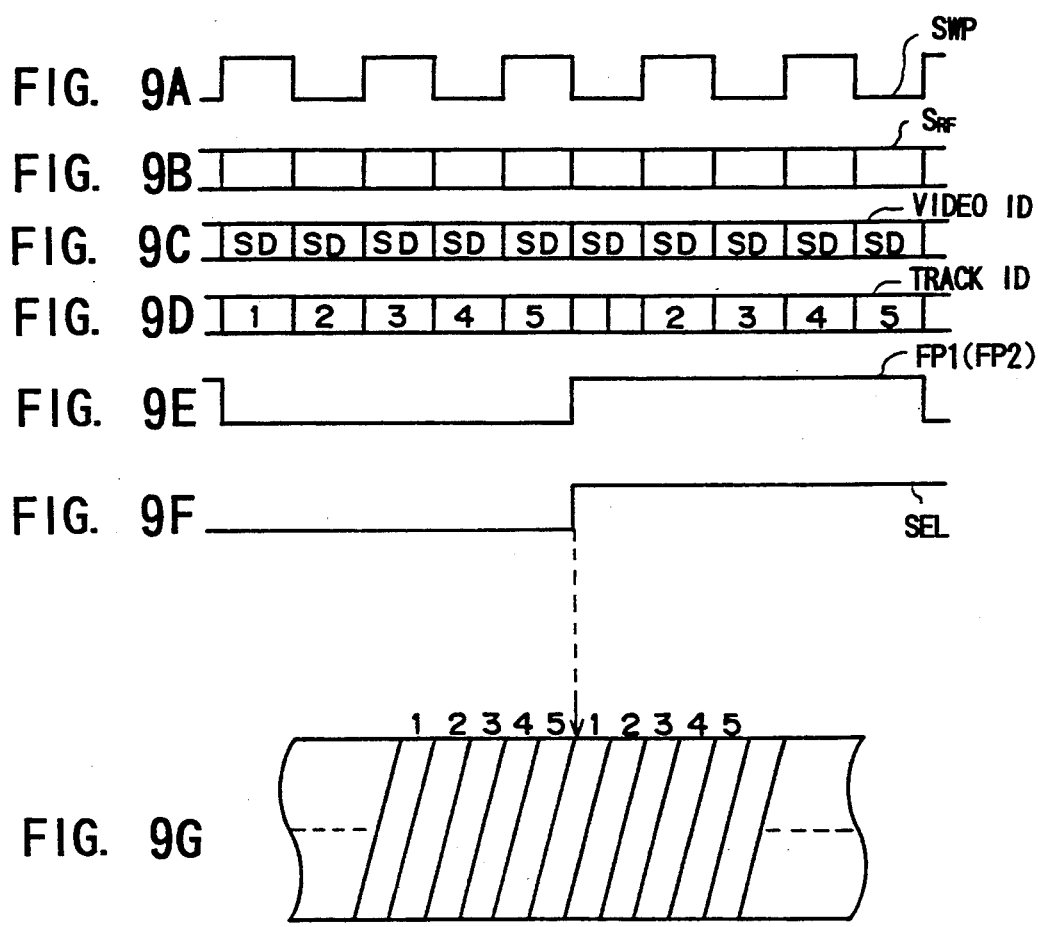

APPARATUS FOR SELECTIVELY RECORDING AND REPRODUCING A DIGITAL VIDEO SIGNAL TO PROVIDE A SMOOTH CONTINUATION IN A VIDEO PICTURE PRODUCED THEREFROM

BACKGROUND OF THE INVENTION

The present invention relates to a video tape recorder and more particularly to apparatus for selectively recording and reproducing a digital video signal which provides smooth continuation in the video picture reproduced from a medium on which new digital video signals are recorded immediately following previously recorded digital video signals.

Digital video tape recorders are known to convert an analog video signal into a digital video signal and then record the digital video signal on a magnetic tape medium. The recording and reproducing of digital video signals is more advantageous than the recording and reproducing of analog video signals because the picture quality of the reproduced digital video signal will not deteriorate through multiple dubbings. Moreover, error correction by way of digital processing further minimizes distortion of the reproduced digital video signal.

However, when an analog video signal is digitized, the amount of data representing that video signal is substantially greater than its analog counterpart. For this reason, data compression which uses a technique known as segment-recording typically is used to record the digital video signal. Segment-recording refers to recording one field interval of a digital video signal on a plurality of tracks.

One type of video tape recorder using the segment-recording technique utilizes several magnetic heads on a rotary drum, with each magnetic head recording a portion of a field interval of the digital video signal. In one embodiment, a plurality of magnetic heads scan tracks simultaneously resulting in an arrangement wherein the number of heads mounted on the rotary drum is significantly greater than traditional analog video tape recorders and this leads to the disadvantage that the construction of the rotary drum becomes complicated. When the mode of operation is switched from a reproducing mode to a recording mode in a video tape recorder using the segment-recording technique as described above, mode switching must occur in synchronization with the rotation of the rotary drum to provide smooth continuation in the recorded picture.

Another type of video tape recorder using the segment-recording technique includes a rotary drum having an arrangement of magnetic heads similar to that of an analog video recorder, but wherein the rotating speed of the rotary drum is increased such that a field interval is recorded on a plurality of tracks during the time period of one field. However, this type of video tape recorder may not provide a smooth continuation in the recorded video picture when switching from a reproducing mode to a recording mode since there is a high probability that such switching will not occur at the end of a field interval. For example, at the changeover point, reproduction of the digital video signal will terminate at a point when some but not all of the tracks included in one field interval are reproduced, but recording which starts at the beginning of a field is then initiated at a point located somewhere in the middle of this field interval thus resulting in a distorted transition from the signal which had previously been recorded to the signal presently being recorded.

Furthermore, a digital video signal derived from or representing a "standard" television signal and a digital video signal derived from or representing a high definition television signal may be recorded by the same video recorder. (For the purpose of the present discussion, and as used herein, a "standard" television signal is a television signal that conforms to a conventional broadcast format, such as NTSC, PAL, SECAM or the like.) The number of tracks necessary to record a field interval of a digital video signal representing a standard television signal is different from the number of tracks necessary to record a field interval of a digital video signal representing a high definition television signal. Therefore, the video tape recorder of the above design must have two different rotating speeds of the rotary drum in order to record and reproduce digital video signals representing standard and high definition television signals. However, smooth continuation of the video picture is difficult to achieve at the changeovers of reproduction and recording of these digital video signals for the above noted reasons.

OBJECTS OF THE INVENTION

Accordingly, it is an object of the present invention to provide apparatus for recording and reproducing a digital video signal which overcomes the shortcomings of the above described devices.

It is another object of the present invention to provide apparatus for recording and reproducing a digital video signal which provides smooth continuation in the video picture reproduced from a medium on which new digital video signals are recorded immediately following previously recorded digital video signals.

A further object of the present invention is to provide apparatus for recording and reproducing a digital video signal which provides smooth continuation in the ultimately reproduced video picture at a transition that occurs when the apparatus is changed over from reproducing a previously recorded digital video signal to recording a new digital video signal.

An additional object of this invention is to provide apparatus for recording and reproducing a digital video signal having a rotary drum whose construction is not unduly complicated.

Still another object of the present invention is to provide apparatus for recording and reproducing a digital video signal having a rotary drum driven at constant speed during recording and reproducing of digital video signals representing both standard and high definition television signals.

Various other objects, advantages and features of the present invention will become readily apparent to those of ordinary skill in the art, and the novel features will be particularly pointed out in the appended claims.

SUMMARY OF THIS INVENTION

In accordance with one embodiment of the present invention, apparatus for selectively recording and reproducing a digital video signal is comprised of a signal processor for processing a video signal into predetermined units of a digital video signal, each unit corresponding to one field or frame interval of the video signal. Each unit of the digital video signal, together with identification data, is recorded on a plurality of recording tracks formed on a magnetic tape, with the identification data identifying the digital video signal recorded on the magnetic tape such as the track on which the digital video signal is recorded, the frame of the video signal, the type of video signal (e.g. standard or high definition), the mode of recording (e.g. standard or long time recording), etc. When a new digital video signal is to be recorded immediately following an existing digital video signal, the magnetic tape is rewound by a predetermined distance, then the digital video signal and identification data that had been recorded previously are reproduced until the end of a unit is reached, whereupon the recording circuitry is activated to record the new digital video signal.

As one aspect of this invention, the predetermined unit is one field interval when the standard recording mode is selected and the predetermined unit is one frame interval when the long time recording mode is selected. The magnetic tape is driven to move at a first tape speed when the standard recording mode is selected and at a second tape speed equal to half the first tape speed when the long time recording mode is selected.

As another aspect of this invention, each unit of the digital video signal and its identification data are recorded on a first predetermined number of recording tracks when the digital video signal represents a standard television signal and each unit of the digital video signal and its identification data are recorded on a second predetermined number of recording tracks when the digital video signal represents a high definition television signal. Preferably, the second predetermined number of tracks is twice the first predetermined number of tracks.

As yet a further aspect of this invention, when the digital video signal represents a standard television signal, the tape is driven at a first speed when the standard recording mode is selected and at a second speed equal to half the first speed when the long time recording mode is selected. When the digital video signal represents a high definition television signal, the tape is driven at a third speed when the standard recording mode is selected and at a fourth speed equal to half the third tape speed when the long time recording mode is selected. Advantageously, the first and fourth tape speeds are equal.

The following detailed description given by way of example and not intended to limit the present invention solely thereto, will best be understood in conjunction with the accompanying drawings wherein like reference numerals denote like elements and parts.

BRIEF DESCRIPTION OF THE DRAWINGS

FIG. 8 is a flowchart of the operation of recording a digital video signal immediately following a previously recorded video signal;

FIGS. 9A to 9G are timing diagrams useful in understanding how the present invention operates to record a new digital video signal immediately following an existing video signal representing a standard television signal; and FIGS. 10A to 10E are timing diagrams similar to FIGS. 9A to 9E for the recording of digital video signals which represent high definition television signals.

DETAILED DESCRIPTION OF CERTAIN PREFERRED EMBODIMENTS

Figure 1:
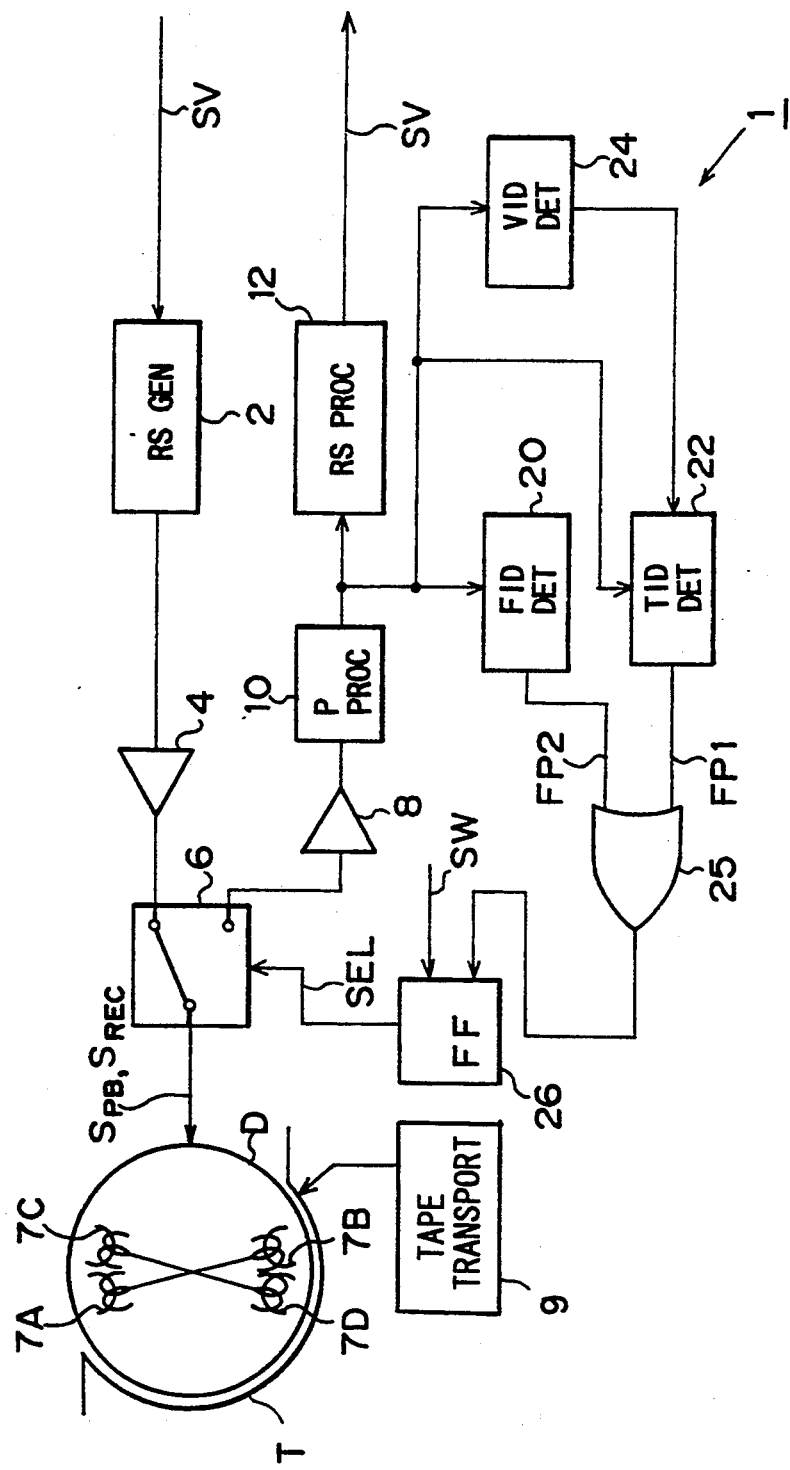
FIG. 1 is a block diagram of apparatus for selectively recording and reproducing a digital video signal according to an embodiment of the present invention.

Referring now to the drawings, FIG. 1 is a block diagram representation of a video tape recorder 1 for digitally recording and reproducing a video signal SV to provide a smooth continuation in the video picture reproduced from a medium on which new digital video signals are recorded immediately following previously recorded digital video signals. In the embodiment described herein, video tape recorder 1 segment-records a digital video signal $S_{REC}$ during a recording mode and reproduces a segment-recorded digital video signal $S_{PB}$ during a reproducing mode.

During the recording mode, a recording signal generating circuit 2 processes a video signal SV into units of field intervals or frame intervals of digital video signal $S_{REC}$. Each unit of digital video signal $S_{REC}$ ultimately is recorded on several recording tracks formed on a magnetic tape T. Video signal SV may be a standard television signal (as previously defined) or a high definition television signal. Video tape recorder 1 during the recording mode may be selected to record video signal SV in a standard recording mode or a long time recording mode. The long time recording mode provides twice the recording time on a given length of magnetic tape since the magnetic tape is driven at half the speed as during the standard recording mode. The unit as described above is a field interval when digital video signal $S_{REC}$ is recorded in the standard recording mode and is a frame interval when recorded in the long time recording mode.

Digital video signal $S_{REC}$ further contains identification data identifying digital video signal $S_{REC}$. This identification data identifies a field or frame of digital video signal $S_{REC}$, whether video signal SV is a standard television signal or a high definition television signal, the mode of recording (e.g. standard or long time) and track information indicating those tracks on which digital video signal $S_{REC}$ is recorded.

Digital video signal $S_{REC}$ is supplied by way of an amplifier 4 and a selector circuit 6 to magnetic heads 7A to 7D for recording onto a magnetic tape (T). Magnetic head pair 7A and 7B are of positive and negative azimuth angles and are disposed on a rotary drum D angularly displaced 180° from each other. Similarly, magnetic head pair 7C and 7D are of positive and negative azimuth angles and are also disposed on rotary drum D angularly displaced 180° from each other. When video signal SV is a standard television signal, magnetic heads 7A and 7B record digital video signal $S_{REC}$. When video signal SV is a high definition television signal, magnetic heads 7A to 7D record digital video signal $S_{REC}$. Likewise, during a reproducing mode, magnetic heads 7A and 7B are used to reproduce a digital video signal $S_{PB}$ representing a standard television signal and magnetic heads 7A to 7D are used to reproduce digital video signal $S_{PS}$ representing a high definition television signal.

In the reproducing mode, selector circuit 6 supplies digital video signal $S_{PB}$ to an amplifier circuit 8, and the amplified digital video signal $S_{PB}$ is then processed by a preprocessing circuit 10 which corrects frequency characteristics thereof. A reproducing signal processing circuit 12 removes the identification data from digital video signal $S_{PB}$, provides further processing, and then supplies a video signal SV as an output.

When the recording mode as discussed above is initially activated, video tape recorder 1 performs the following routine to assure a smooth continuation in the video picture derived from a transition from the reproducing of a previously recorded digital video signal to the reproducing of the digital video signal which is about to be recorded.

The magnetic tape T is first rewound by a tape transport 9 for a predetermined distance corresponding to several recorded tracks. This predetermined distance may correspond to one field interval or one frame interval of the recorded digital video signal. Video tape recorder 1 then is set to the reproducing mode to reproduce digital video signal $S_{PB}$ which is supplied to amplifier 8 by selector circuit 6. The digital video signal is amplified by the amplifier circuit, processed by preprocessing circuit 10 and then supplied in parallel to a frame ID detecting circuit 20, a track ID detecting circuit 22 and a video ID detecting circuit 24. Frame ID detecting circuit 20, track ID detecting circuit 22 and video ID detecting circuit 24 extract identification data relating to digital video signal $S_{PB}$.

Frame ID detecting circuit 20 detects when an end of a unit (e.g. a field interval or frame interval) is reached during reproduction of digital video signal $S_{PB}$. Frame ID detecting circuit 20 supplies a frame pulse FP2 to an OR circuit 25 indicating the end of a frame interval.

Video ID detecting circuit 24 detects whether the digital video signal $S_{PB}$ represents a standard or high definition television signal and whether it was recorded in the standard or long time recording mode. This information is supplied to track ID detecting circuit 22. The track ID detecting circuit detects the beginning of each new track that is reproduced, counts the number of tracks detected and based upon information received from video ID detecting circuit 24., supplies a frame pulse FP1 to OR circuit 25 indicating the end of a frame interval. A variation of this embodiment supplies "frame pulse" FP1 to indicate the end of a field when digital video signal $S_{PB}$ was recorded in the standard recorded mode.

OR circuit 25 receives frame pulses FP1 and FP2 and at the occurrence of either frame pulse FP1 or FP2, supplies a pulse to a flip-flop circuit 26 indicating the end of a frame interval. Frame pulses FP1 and FP2 may be identical and may serve the same purpose, but the redundant circuits are provided to ensure the detection of the end of a frame interval in the event that some of the identification data is not available or cannot be detected.

Flip-flop circuit 26 supplies a switching signal SEL to control selector circuit 6. When switching signal SEL is in a low state, representing the reproducing mode, selector circuit 6 supplies digital video signal $S_{PB}$ to amplifier circuit 8 as described above. When switching signal SEL is in a high state, representing the recording mode, selector circuit 6 is changed over to supply digital video signal $S_{REC}$ from amplifier 4 to magnetic heads 7A to 7D to be recorded. A mode switch signal SW is supplied to flip-flop circuit 26 to indicate whether the recording mode or the reproducing mode is selected and thereby set or reset the flip-flop circuit.. During reproduction of digital video signal $S_{PB}$, switching signal SEL and mode switch signal SW are such as to represent selection of the reproducing mode. When the mode of operation is switched from the reproducing mode to the recording mode, mode switch signal SW immediately changes state but switching signal SEL does not change state until flip-flop circuit 26 receives a frame pulse from OR circuit 25. Thus, video tape recorder 1 does not record digital video signal $S_{REC}$ until an end of a frame interval is produced.

Figure 2A:
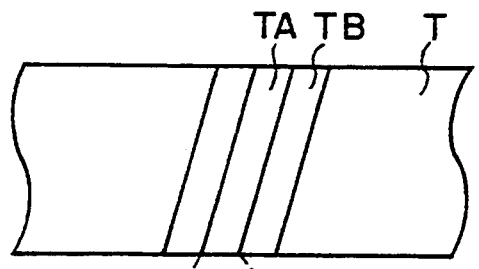
FIGS. 2A to 2C are schematic diagrams showing the recorded digital video signal.
Figure 2B:
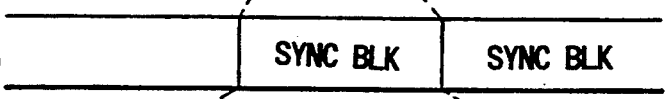
Figure 2C:
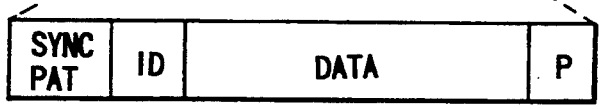

The digital video signal now will be described with reference to FIGS. 2A to 2C. Recording signal generating circuit 2 processes video signal SV into units of field intervals when digital video signal $S_{REC}$ is recorded in the standard recording mode and into units of frame intervals when recorded in the long time recording mode. In either mode, each unit (field or frame) of digital video signal $S_{REC}$ is compressed and shuffled. Each unit is then divided into five sync blocks when digital video signal $S_{REC}$ represents a standard television signal and into ten sync blocks when the signal represents a high definition television signal. Each sync block corresponds to a track on a magnetic tape T (FIG. 2A and 2B). Identification data ID as described above and an error-correcting code P are added to each sync block. In addition, a sync pattern is added at the head of each sync block (FIG. 2C).

Figure 3A:
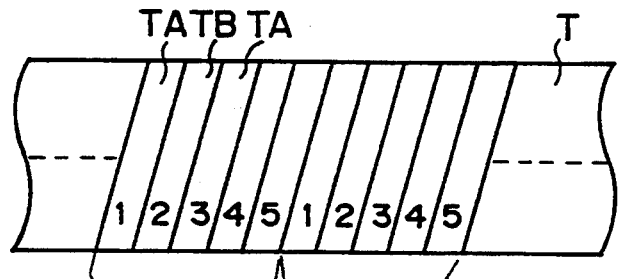
FIGS. 3A and 3B are schematic diagrams of a digital video signal representing a standard television signal recorded in the standard recording mode.
Figure 3B:
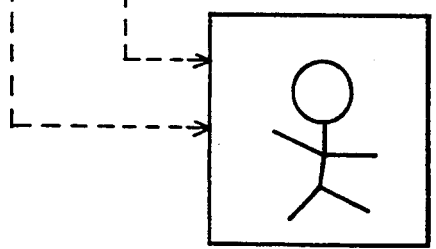

Recording of a standard television signal in the standard recording mode now will be described in conjunction with the schematic diagrams shown in FIGS. 3A and 3B. Recording signal generating circuit 2 processes standard television signals into units of field intervals where each field interval is compressed, shuffled and then divided into five sync blocks. Identification data identifies each block as a first block, second block, third block, fourth block and fifth block before each block is recorded on a track as shown in FIG. 3A. Magnetic heads 7A and 7B alternate recording of each block wherein magnetic head 7A records tracks TA and magnetic head 7B records tracks TB. Since a field interval of digital video signal $S_{REC}$ is allocated to five tracks, a frame interval corresponds to ten tracks. (FIGS. 3A and 3B). FIG. 3B represents a video picture that is reproduced from the two field intervals of the digital video signal.

Figure 4A:
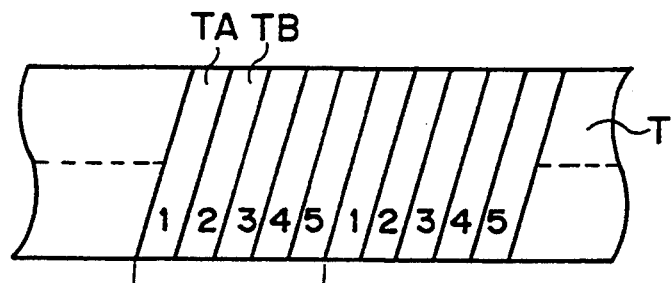
FIGS. 4A and 4B are schematic diagrams of a digital video signal representing a standard television signal recorded in the long time recording mode.
Figure 4B:
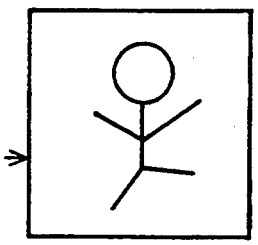

FIGS. 4A and 4B illustrate the recording of a standard television signal in the long time recording mode. Recording signal generating circuit 2 processes standard television signals into units of frame intervals in the case of long time recording. Each frame interval is compressed, shuffled and divided into five sync blocks. Identification data identifies each block, from the first block to the fifth block. Each block is then recorded on a track as shown in FIG. 4A.

Magnetic heads 7A and 7B alternate the recording of each block wherein magnetic head 7A records tracks TA and magnetic head 7B records tracks TB. Each frame interval is allocated to five tracks as shown in FIGS. 4A and 4B. Thus, since a frame interval corresponds to five tracks during long time recording and a frame interval of a standard television signal recorded in the standard recording mode corresponds to ten tracks, the tape speed during long time recording is half the tape speed during standard recording. FIG. 4B represents a video picture that is reproduced from the five-track frame interval of the digital video signal.

Figure 5A:
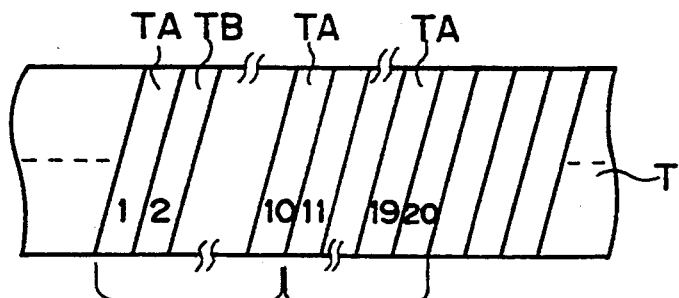
FIGS. 5A and 5B are schematic diagrams of a digital video signal representing a high definition television signal recorded in the standard recording mode.
Figure 5B:
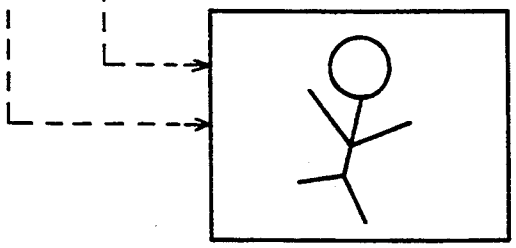

Recording of a high definition television signal recorded in the standard recording mode now will be described with reference to FIGS. 5A and 5B. Recording signal generating circuit 2 processes high definition television signals into units of field intervals when video tape recorder 1 is in the standard recording mode. Each unit (field interval) is compressed, shuffled, and divided into ten sync blocks. Identification data identifies each block as a first block to a tenth block as shown in FIG. 5A. A second unit (second field of the frame) can be identified as an eleventh block to a twentieth block. It is equally acceptable to identify the second unit as blocks one through ten.

Magnetic heads 7A to 7D alternate recording of each block wherein magnetic heads 7A and 7B alternately record tracks TA and magnetic heads 7C and 7D alternately record tracks TB. Since a field interval of digital video signal $S_{REC}$ is allocated to ten tracks, a frame interval corresponds to twenty tracks (FIGS. 5A and 5B). Thus, since only ten tracks are recorded for each frame of standard television signal in the standard recording mode, the tape speed during standard recording of high definition television signal is twice the tape speed of standard recording of standard television signal. FIG. 5B represents a video picture that is reproduced from the two field intervals of the digital video signal.

Recording a high definition television signal in the long time recording mode is similar to recording a high definition television signal in the standard recording mode except a unit consists of a frame interval of digital video signal $S_{REC}$. Here, each unit (frame interval) is divided into ten sync blocks where identification data identifies each block as a first block to a tenth block. Magnetic heads 7A to 7D alternate the recording of each block. However, since each frame is allocated to ten tracks in the long time recording mode as compared with twenty tracks per frame in the standard recording of a high definition television signal, the tape speed during this mode is half the tape speed of standard recording of a high definition television signal. Thus, the tape speed during this mode is equal to the tape speed during the recording of a standard television signal in the standard recording mode.

Figure 6:
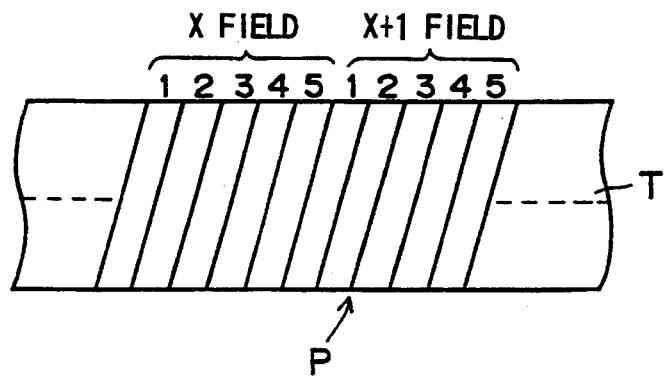
FIG. 6 is a schematic diagram showing the changeover from a reproducing mode to a recording mode of a digital video signal at a point in the middle of a field or frame of a standard television signal.
Figure 7:
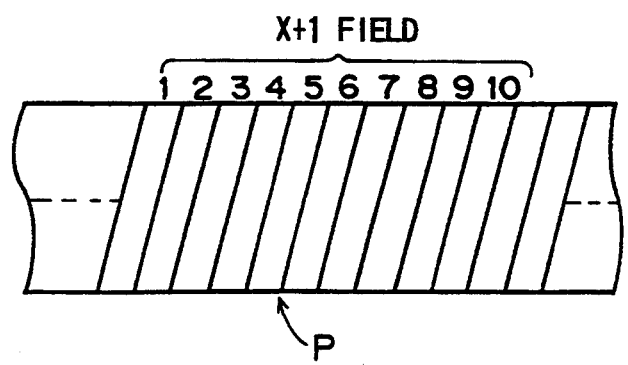
FIG. 7 is a schematic diagram showing the changeover from a reproducing mode to a recording mode of a digital video signal at a point in the middle of a field of a high definition television signal.

FIGS. 6 and 7 illustrate the changeover from reproducing a digital video signal recorded in the standard recording mode to recording a new digital video signal. During reproduction of a digital video signal representing a standard television signal from magnetic tape T, one track is scanned at a time. As described above, each track contains one sync block of information relating to only a portion of an entire field or frame interval. At the termination of the reproducing mode, a switch point P represents the location of a head when reproduction from magnetic tape T terminates. In FIG. 6 it is assumed that the digital video signal had been recorded in the standard recording mode. Here, switch point P occurs after the second track of the second field of the frame. Thus, the three remaining tracks of the field are overwritten during the ensuing recording by a video tape recorder which does not include the present invention.

FIG. 7 illustrates the termination of the reproducing mode at switch point P, wherein the digital video signal represents a high definition television signal that had been recorded in the standard recording mode. In this example, switch point P occurs after the fifth track of the second field of the frame. Therefore, the five remaining tracks of the field are overwritten during the ensuing recording by a video tape recorder which does not include the present invention.

Although not shown, it will be appreciated that digital video signals representing standard television signals and high definition television signals that had been recorded in the long time recording mode exhibit the same above described shortcoming when the video recorder is changed over from its reproducing mode to its recording mode.

The manner in which the present invention operates to record a new digital video signal immediately following an existing digital video signal now will be described in conjunction with the flowchart shown in FIG. 8. Step SP1 represents the initiation of a new recording mode to record a new digital video signal $S_{REC}$. The initiation of this recording mode may occur when the video recorder presently is disposed in its recording or reproducing mode, as when a previously recorded digital video signal is being played back. In either case, when the existing recording or reproducing operation is terminated, the subsequent initiation of recording (Step SP1) will likely occur when the magnetic head is positioned on magnetic tape T midway in a field or frame interval.

Once recording is initiated by a user (step SP1), a system control circuit (not shown) initiates the recording sequence by generating a start recording command (step SP2). The system control circuit proceeds to step SP3 in which video tape recorder 1 is activated to rewind magnetic tape T by a predetermined distance corresponding to several tracks. This predetermined distance may correspond to a field or frame interval to assure that magnetic tape T is rewound to a point prior to the beginning of the field or frame at which recording was originally initiated. At the completion of rewinding magnetic tape T, the system control circuit proceeds to step SP4.

The operating mode of video tape recorder 1 switches to the reproducing mode at step SP4. Here, digital video signal $S_{PB}$ is reproduced until reproducing is terminated at step SP7. Once reproducing is initiated, processing proceeds to step SP5 at which digital video signal $S_{PB}$ is processed by frame ID detecting circuit 20, track ID detecting circuit 22 and video ID detecting circuit 24.

To best appreciate the operation represented by steps SP5 to SP7, reference is made to FIGS. 9A to 9G. FIGS. 9A to 9G are timing diagrams descriptive of various signals produced during the reproduction of a digital video signal representing a standard television signal recorded in the standard recording mode. During step SP5, a head change over pulse, also known as a switching pulse signal SWP (FIG. 9A), is produced as the heads rotate. Switching pulse signal SWP is synchronized with the rotation of rotary drum D and a periodic signal SRF (FIG. 9B) is produced in synchronism therewith.

Video ID detecting circuit 24 detects the standard of digital video signal $S_{PB}$ (e.g. whether it represents a standard or high definition television signal) as well as the recording mode of digital video signal $S_{PB}$ (e.g. standard or long time). FIG. 9C portrays video ID information supplied to track ID detecting circuit 22 during the scanning of each track, and symbol SD represents that a standard television signal had been digitized and recorded in the standard recording mode.

Track ID detecting circuit 22 detects and counts the track identification data reproduced from each track; and based upon the number of tracks per unit: (five tracks per field unit or ten tracks per field unit depending upon whether a standard or high definition television signal had been recorded), recycles the count at the end of a unit (FIG. 9D). Since the video ID data (FIG. 9C) indicates that a standard television signal had been recorded in the standard recording mode, the track ID detecting circuit cycles through a count of five tracks per unit; and in this case, a unit is a field interval. Track ID detecting circuit 22 supplies frame pulse FP1 (FIG. 9E) to OR circuit 25. Frame pulse FP1 changes state at the end of each unit (i.e. at the end of each field). Frame ID detecting circuit 20 detects the end of each field and the end of each frame and supplies frame pulse FP2 (FIG. 9E) to OR circuit 25. Similarly, frame pulse FP2 changes state at the end of each field. As an example, frame ID detecting circuit may detect each track identification data or simply may sense when the track identification data represents track number five.

Step SP6 is initiated when OR circuit 25 supplies a frame pulse to flip-flop circuit 26 at the occurrence of either frame pulse FP1 or frame pulse FP2. Flip-flop circuit 26 supplies switching signal SEL to control selector circuit 6. Prior to receipt of the frame pulse from OR circuit 25, switching signal SEL is in a low state representing the reproducing mode. Upon receipt of the frame pulse, switching signal SEL changes state (FIG. 9F), thereby terminating the reproducing mode (step SP7) and initiating the recording mode.

Thus, upon termination of reproducing and initiation of recording at step SP7, recording of digital video signal $S_{REC}$ commences at the beginning of a frame (FIG. 9G), thereby providing a smooth continuation or transition in the video picture reproduced from these tracks.

The reproduction of digital video signals representing standard television signals that had been recorded in the long time recording mode is similar to the above described process except the unit is defined by a frame interval formed of five tracks. Video ID detecting circuit 24 in this case detects that a standard television signal had been recorded in the long time recording mode.

FIGS. 10A to 10E illustrate timing diagrams descriptive of various signals produced during the reproduction of a digital video signal representing a high definition television signal that had been recorded in the standard recording mode. During step SP4 (FIG. 8), the mode of operation of video tape recorder 1 switches to a reproducing mode and digital video signal $S_{PS}$ is reproduced until the reproducing mode is terminated at step SP7.

From step SP4 processing proceeds to step SP5 wherein digital video signal $S_{PB}$ is processed by frame ID detecting circuit 20, track ID detecting circuit 22 and video ID detecting circuit 24. As was described above, switching pulse signal SWP (FIG. 10A), synchronized with the rotation of rotary drum D, is produced as a head changeover pulse and periodic signal $S_{RF}$ (FIG. 10B) is produced in synchronism therewith.

Video ID detecting circuit 24 detects the standard of the television signal represented by digital video signal $S_{PB}$ as well as the recording mode of the digital video signal. FIG. 10C portrays video ID information supplied to track ID detecting circuit 22 during the scanning of each track and symbol HD signifies that a high definition television signal had been digitized and recorded in the standard recording mode.

Track ID detecting circuit 22 detects and counts the track identification data reproduced from each track; and recycles the count at the end of each unit which in the present example, is a field (FIG. 10D). Each field consists of ten tracks when the digital video signal represents a high definition television signal recorded in the standard recording mode. Track ID detecting circuit 22 supplies frame pulse FP1 to OR circuit 25 at the end of each unit:. Similarly, frame ID detecting circuit 20 detects the end of each field and supplies frame pulse FP2 to OR circuit 25 at the end of each unit.

When step SP6 is initiated, switching signal SEL changes state (FIG. 10E) to terminate the reproducing mode (step SP7) and initiate the recording mode.

The reproduction of a digital video signal that represents a high definition television signal which had been recorded in the long time recording mode is similar to the just-described operation, except that a 10-track unit corresponds a frame interval.

While the present invention has been particularly shown and described in conjunction with preferred embodiments thereof, it will be readily appreciated by those of ordinary skill in the art that various changes may be made without departing from the spirit and scope of the invention. For example, although two frame pulse signals FP1 and FP2 are generated by track ID detecting circuit 22, frame ID detecting circuit 20 and video ID detecting circuit 24, the present invention is not limited to generating redundant frame pulse signals and may generate only one frame pulse signal.

As another example, although the present discussion is directed to standard television signals and high definition television signals, the present invention is not limited solely to these types of signals and may be widely applied to the recording and reproducing of various other video signals.

Still further, although the digital video signal is capable of being recorded in a standard recording mode and a long time recording mode, other recording modes such as extended long time recording, may be used by video tape recorder 1 described herein.

Therefore, it is intended that the appended claims be interpreted as including the embodiments described herein, the alternatives mentioned above, and all equivalents thereto.

I claim:

1. Apparatus for selectively recording and reproducing a digital video signal, comprising:
    signal processing means for processing a digital video signal into predetermined units of at least one field interval thereof;
    means for supplying identification data identifying the digital video signal within each of said units;
    recording means operable to record one unit of said digital video signal together with said identification data on a plurality of recording tracks extending obliquely across a magnetic tape;

reproducing means operable to reproduce said recorded digital video signal and said identification data; and control means actuable for rewinding said magnetic tape by a predetermined distance when said control means is initially actuated, then for activating said reproducing means to reproduce a digital video signal and identification data that has been recorded on said magnetic tape until said identification data indicates an end of a unit of said digital video signal is reproduced, and then for activating said recording means.

2. The apparatus of claim 1, wherein said predetermined unit is one frame interval of said digital video signal.

3. The apparatus of claim 2, wherein said identification data identifies a frame of said digital video signal.

4. The apparatus of claim 1, wherein said identification data is recorded on each of said recording tracks and identifies the track on which said digital video signal is recorded.

5. The apparatus of claim 4, further comprising means for selecting a standard recording mode or a long time recording mode; and wherein said predetermined unit is one field interval of said digital video signal when said standard recording mode is selected and said predetermined unit is one frame interval of said digital video signal when said long time recording mode is selected.

6. The apparatus of claim 5, wherein said identification data further includes data which identifies the recording mode of said recorded digital video signal.

7. The apparatus Of claim 6, wherein said identification data further includes data which identifies a frame of said digital video signal.

8. The apparatus of claim 7, further including means to move the magnetic tape at a first tape speed when the standard recording mode is selected and at a second tape speed equal to half of the first tape speed when the long time recording mode is selected.

9. The apparatus of claim 7, wherein said recording means is selectively operable to record a digital video signal representing a standard television signal or a digital video signal representing a high definition television signal.

10. The apparatus of claim 9, wherein said identification data further includes data which identifies the digital video signal as a standard television signal or a high definition television signal.

11. The apparatus of claim 10, wherein said recording means records each unit of said digital video signal and said identification-data on a first predetermined number of recording tracks when said digital video signal is a standard television signal and said recording means records each unit of said digital video signal and said identification data on a second predetermined number of recording tracks when said digital video signal is a high definition television signal.

12. The apparatus of claim 11, wherein said second predetermined number is twice said first predetermined number.

13. The apparatus of claim 12, further including means to move the magnetic tape at a first tape speed when the standard recording mode is selected and said digital video signal is a standard television signal, at a second tape speed equal to half the first tape speed when the long time recording mode is selected and said digital video signal is a standard television signal, at a third tape speed when the standard recording mode is selected and said digital video signal is a high definition television signal, and at a fourth tape speed equal to half the third tape speed when the long time recording mode is selected and said digital video signal is a high definition television signal.

14. The apparatus of claim 13, wherein the first tape speed equals the fourth tape speed.

* * * * *